Sept. 25, 1928.  
C. A. MORAN  
1,685,239  
RECIPROCATING SAW MACHINE  
Filed March 13, 1926  
5 Sheets-Sheet 1

Inventor  
Charles A. Moran  
By his Attorneys  
Edwards, Sager + Power

Sept. 25, 1928.

C. A. MORAN 1,685,239

RECIPROCATING SAW MACHINE

Filed March 13, 1926

5 Sheets-Sheet 2

Inventor
Charles A. Moran
By his Attorneys
Edwards, Sager & Power

Sept. 25, 1928.

C. A. MORAN 1,685,239

RECIPROCATING SAW MACHINE

Filed March 13, 1926   5 Sheets-Sheet 3

Inventor
Charles A. Moran
By his Attorneys
Edwards, Sager + Bower

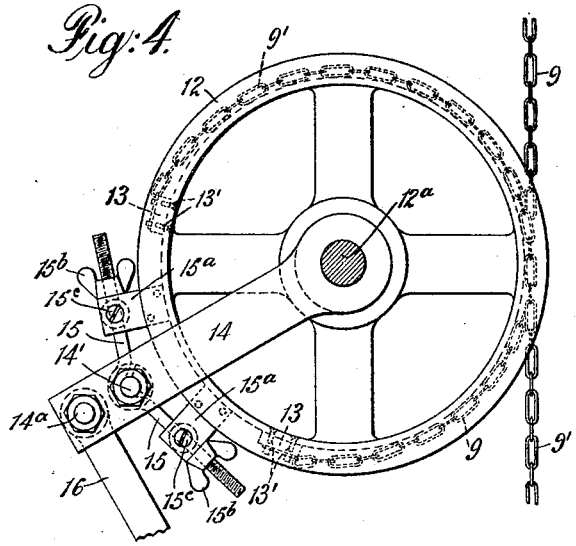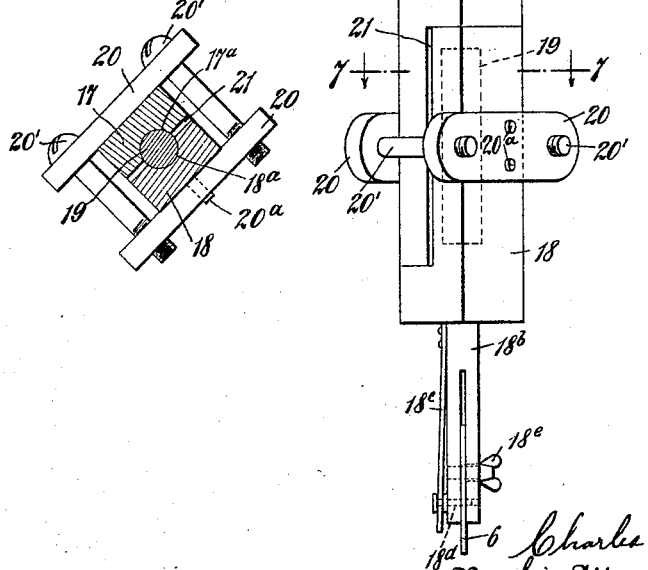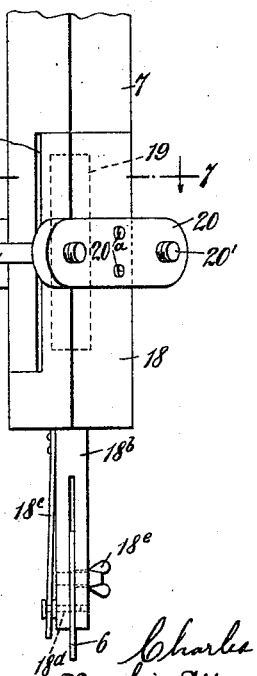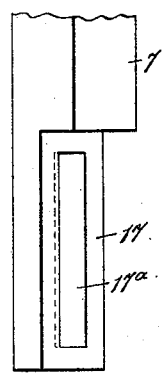

Sept. 25, 1928.　　　　C. A. MORAN　　　　1,685,239
RECIPROCATING SAW MACHINE
Filed March 13, 1926　　　5 Sheets-Sheet 5

Inventor
Charles A. Moran
By his Attorneys
Edwards, Sager & Bower.

Patented Sept. 25, 1928.

1,685,239

UNITED STATES PATENT OFFICE.

CHARLES A. MORAN, OF BERNARDSVILLE, NEW JERSEY.

RECIPROCATING-SAW MACHINE.

Application filed March 13, 1926. Serial No. 94,378.

This invention relates to a reciprocating saw machine especially adapted for metal or wood cutting.

One of the main objects of the invention is to avoid the use of expensive saw blades or bands. Band saw blades have comparatively high initial cost and are expensive to sharpen and adjust, and unless duplicate blades or bands are provided, the machine has to remain idle until the blade or band is resharpened and adjusted. By this invention an ordinary hack saw blade may be used in place of band saws. Such hack saw blades are comparatively inexpensive and when dull may be discarded and a new blade quickly substituted in its place. Another object of the invention is to provide a machine by which accurate work may be done with this type of blade and to provide an improved means of adjustment to correct any inaccuracy in the setting of the saw in relation to the work and to also provide improved means of adjustment for insuring the proper vertical position of the saw blade in relation to the work so as to insure a full operating stroke of the blade and to also accommodate the reception of saw blades of different lengths.

Another object of the invention is to provide proper tension means for moving the work against the blade and for relieving the pressure of the work against the saw blade on the up-stroke. Another object is to provide rigid guiding means for the blade holders adjacent the ends of the blade so as to insure proper alignment of the blade and the retaining of the blade in its proper position at all times. A further object is to provide double bearing surfaces for each of the blade holders in such a manner that a large bearing surface is provided which reduces the wear and insures a continued accurate positioning and guiding of the saw blade holders. Other objects and advantages of this invention will be understood from the following description and accompanying drawings which illustrate a preferred embodiment thereof.

Figure 1:
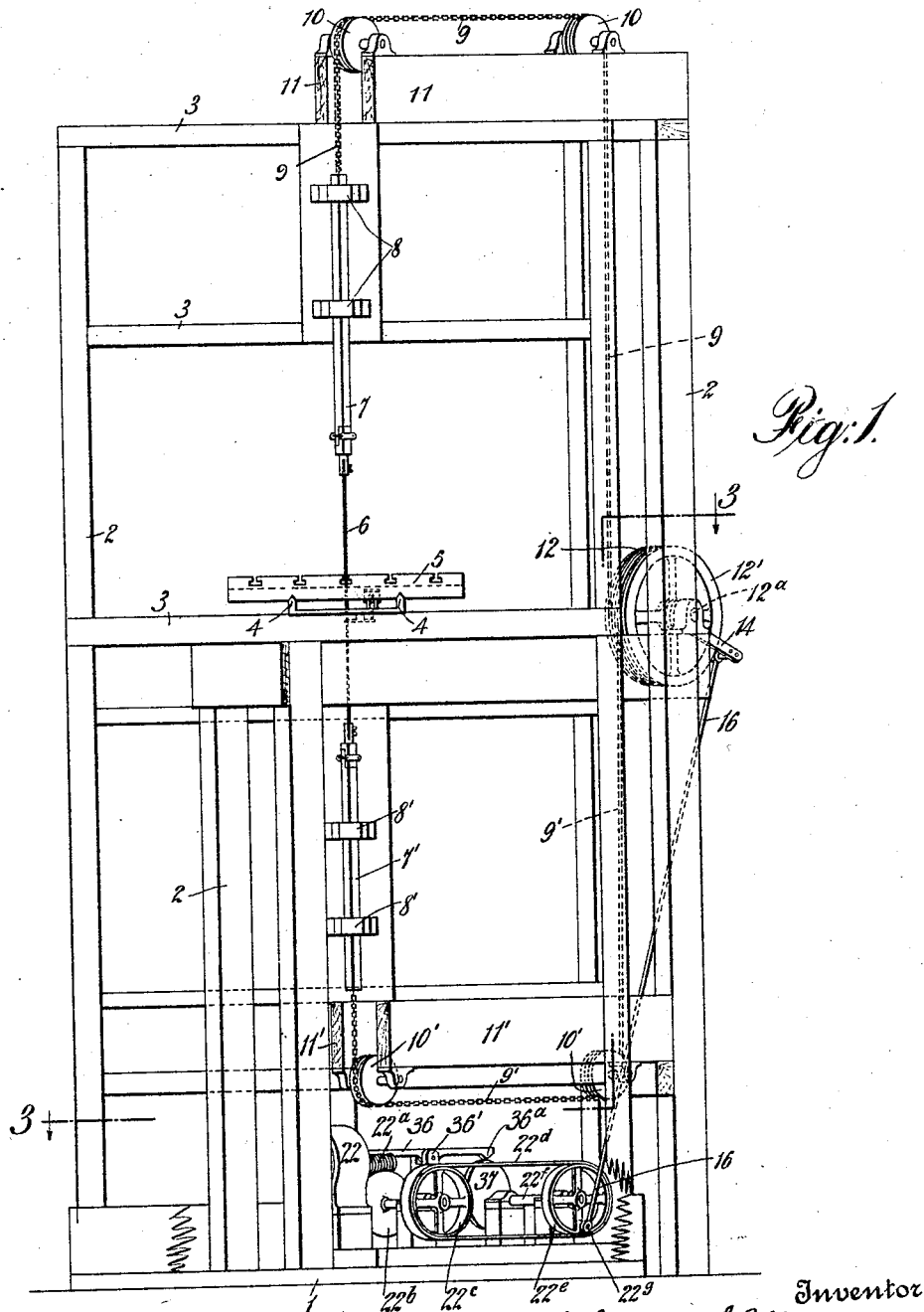
Figure 2:
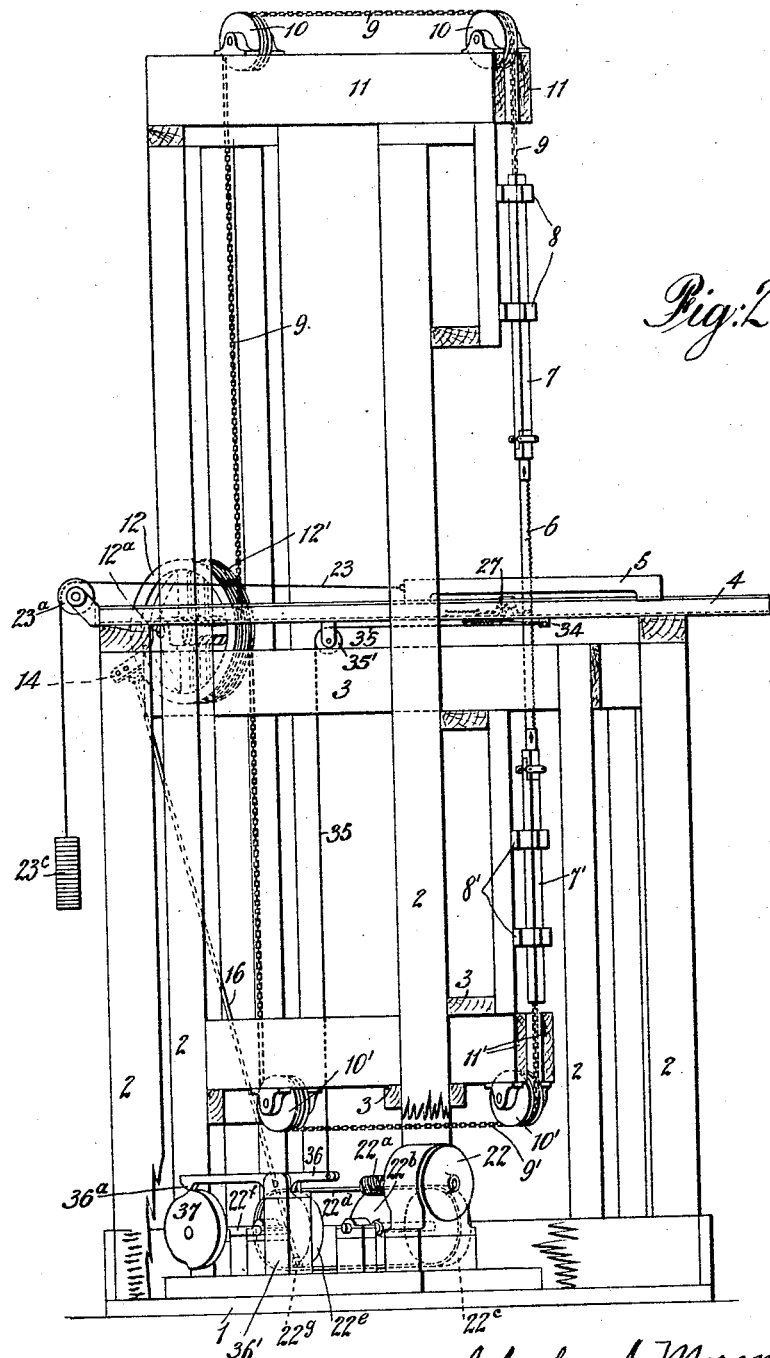
Figure 3:
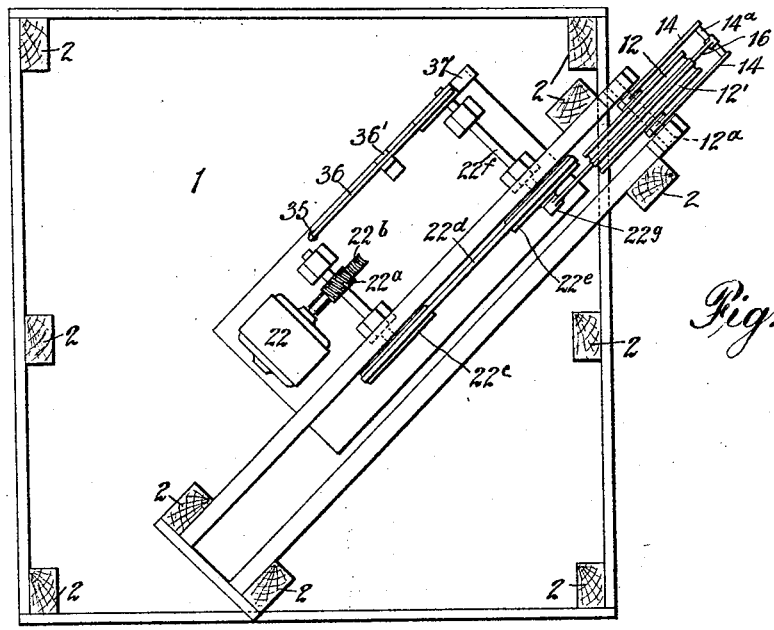
Figure 8:
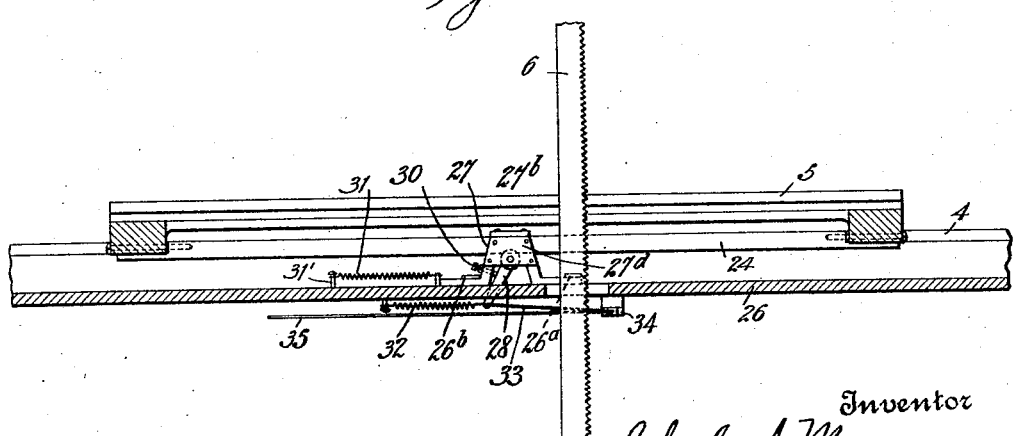
Figure 9:
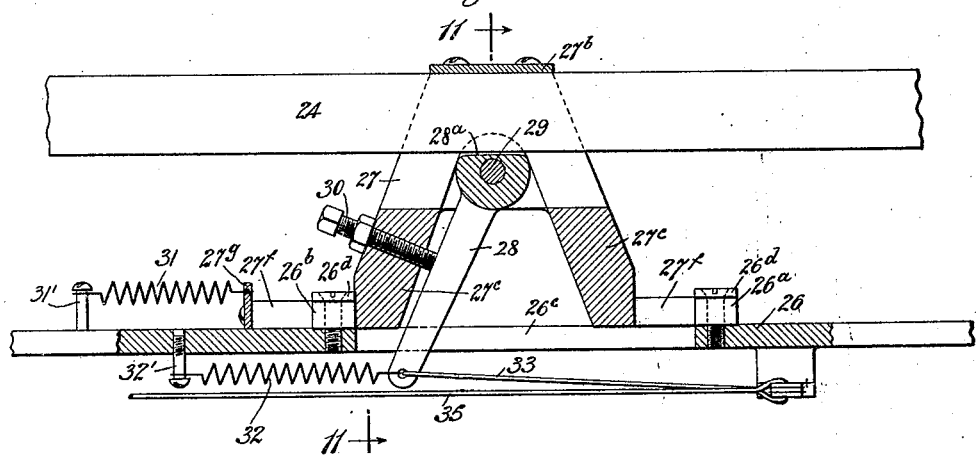
Figure 10:
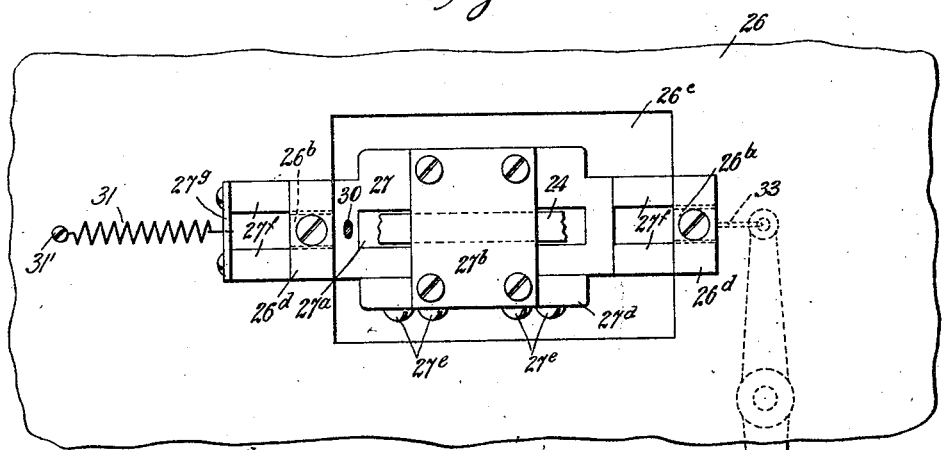
Figure 11:
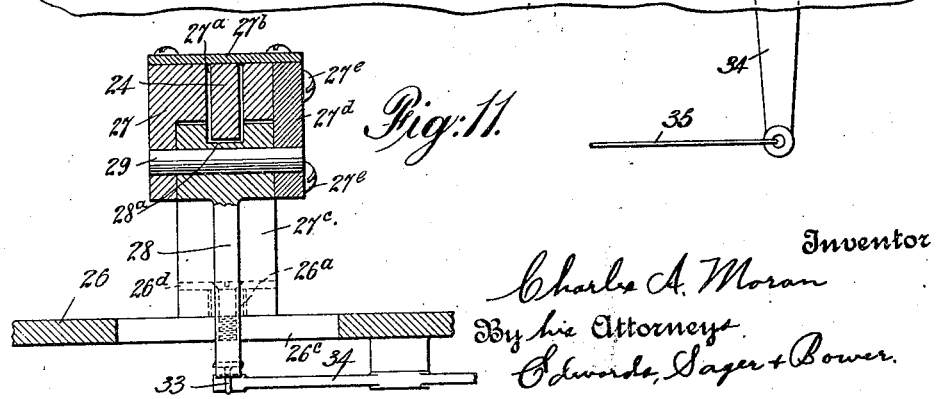

Fig. 1 is a front view with some parts broken away; Fig. 2 is a side view partly in section and with some parts broken away; Fig. 3 is a section on the line 3—3 of Fig. 1; Fig. 4 is a side view of the operating arm and wheels showing the adjustable take-up means; Fig. 5 is a front view of one of the saw blade holders; Fig. 6 is a front view of a part of the holder; Fig. 7 is a section on the line 7—7 of Fig. 5; Fig. 8 is a vertical longitudinal section of the movable table; Fig. 9 is a vertical section enlarged of part of the table controlling mechanism. Fig. 10 is a plan view of same; and Fig. 11 is a section on line 11—11 of Fig. 9.

The machine is mounted upon a base 1 from which upwardly extend suitable uprights 2, which support various cross pieces 3 at different heights along the same, which in turn support various parts of the mechanism. At about the middle of the machine are guideways 4 extending from the front to the back of the machine for carrying the table 5 slidably thereon.

The saw blade 6 is preferably an ordinary commercial type of hack saw blade connected at its upper end to a holder 7 and at its lower end to a corresponding holder 7'. The main part of these holders extend through guides 8, 8', which in turn are suitably supported on the frame. The guides for each holder are preferably spaced a considerable distance apart to insure proper guiding and alignment of the saw holders; also the cross section of the holders is preferably square, as shown in Figs. 5, 6 and 7, as well as in Fig. 1, with one diagonal in line with the direction of movement of the table 5 and likewise of course of the work carried by the table. When the work presses against the saw 6, the wear of the holders 7 against the correspondingly shaped guides 8, is against their rear surfaces, which are at an angle to each other, with the result that the wear is in the direction of movement of the table 5 and the work, and the tendency of sidewise displacement of the saw holders by wear of the parts is avoided.

From the upper end of the holders 7 a cord, band, cable or chain 9 passes over a pair of grooved pulleys 10 which are supported between rearwardly and diagonally extending cross pieces 11. After passing over the rear pulley 10, the cord or chain 9 passes on the inside of and around the under side of a grooved wheel 12, to which the chain 9 is secured, as shown in Fig. 4, and as more fully explained hereinafter. Secured to another wheel 12' on its rear side and extending over the top thereof in a groove thereon is another chain 9', which passes downwardly from the inner periphery of the wheel 12', the chain 9' passing around the underside of two grooved pulleys 10' and then upwardly, where it is fastened to the lower end of the holder 7'. The pulleys 10' are supported between a pair of cross-pieces 11' which extend rearwardly in a diagonal direction from the front of the machine.

The two wheels 12, 12' are loosely mounted on their shaft 12ª and receive respectively the ends of the chains 9 and 9', the ends of these chains being secured to the wheels by suitable clamps 13, such as plates with bolts 13' passing therethrough into the wheels for removably and securely fastening the ends of the chain thereto. This removable fastening means permits the taking up of extreme slack in the chains and also relative adjustment of the chains to each other in considerable degree for securing the proper central vertical position of the saw with reference to the work. Loosely mounted on the shaft 12ª, and outside the wheels 12, 12', as well shown in Figs. 3 and 4, is a pair of rearwardly extending arms 14. A rod 14' extends between these arms and to the rod is connected a pair of eye-bolts 15, one extending upwardly and the other downwardly, as shown in Fig. 4. These eye-bolts respectively, loosely pass through a pair of lugs 15ª, which lugs are respectively fixed to the wheels 12, 12' above and below the arms 14. The eye-bolts carry wing-nuts 15ᵇ on the outer ends thereof; and the lugs 15ª may carry set screws 15ᶜ, which impinge against the eye-bolts 15 for locking them in position. It is evident that by turning up either wing nut, the cord or chain 9, 9' will be tightened to any desired degree and that by loosening one of the wing nuts 15ᵇ and taking up on the other wing nut, the arms 14 and the wheels 12, 12' may be relatively adjusted to any desired fixed position, after which the parts may be locked in place. This gives a convenient means for readily taking up any slack in the cord or chain 9, 9' and adjusting the vertical position of the saw in relation to the work. At the outer ends of the arms 14 is another rod 14ª to which is pivotally connected a downwardly extending rod 16. It is evident that when the rod 16 is reciprocated, the saw blade will be correspondingly reciprocated by means of the chain connections already described.

Referring now to Figs. 5, 6 and 7, the particular means for adjustably connecting the saw blades to the holders 7, 7' will be described. Each end of the holders has approximately half thereof cut away along its length, and preferably in a longitudinal plane parallel with opposite faces of the holder, as well shown in Fig. 6. This leaves an extension 17 at the inner end of the holder, and on the inside face of this extension is cut or ground a cylindrical recess 17ª. At the inner end of the holder is a removable part 18, corresponding in shape to the cut away portion and is also L-shaped to engage the lower end of the holder, as shown in Fig. 5. The part 18 is provided with a recess 18ª corresponding to the recess 17ª and from the end of the part 18 is an extension 18ᵇ which may be square or circular and has a slot to receive the end of the saw blade. At the side of the extension 18ᵇ is a leaf spring 18ᶜ, which carries a pin 18ᵈ, which passes through the slot of the holder and through a perforation in the end of the saw blade for holding it in place. A thumb screw 18ᵉ also passes through the extension 18ᵇ and across the slot for receiving the saw blade, loosely passing through the extension at one side of the slot and having a threaded engagement with the extension at the other side of the slot. This thumb screw serves to clamp the saw firmly in the slot between the divided portions of the extension 18ᵇ.

A short length of a circular rod 19, as well shown in Fig. 7, fits in the opposing recesses 17ª and 18ª. On the opposite outer surfaces of the extensions 17 and the part 18, are plates 20, which receive screws 20' for drawing these plates together and thus clamping the parts firmly into engagement with the rod 19. The size of the rod 19 and the recesses in which it is fitted, is such that when the parts are clamped together, a space 21 is left between opposing faces of the parts 17 and 18, as shown in Figs. 5 and 7. This form of construction secures refined and accurate angular adjustment of the saw blade in relation to the direction of travel of the table. If the blade at any time is out of line or tends to cut the work at a slight angle from that desired, the clamping plates 20 may be loosened and the part 18 of the holder turned slightly around the rod 19 to secure the correct angular position of the saw; and the parts may then be again clamped in the new position. This not only gives convenient and refined adjustment, but experience has proved it to give a firm and certain locking of the parts. If desired one of the plates 20 may be permanently secured to the part 18, but in Figures 5 and 7, there is shown a pair of pins 20ª extending from the part 18 through plate 20, which gives these parts a fixed relation to each other and avoids the parts sliding out of place when the screws 20' are loosened for adjustment.

Referring now to the means for reciprocating the rod 16 and the saw by the parts already described, an electric motor 22 is mounted upon the base, as shown in Figs. 1, 2 and 3. Its shaft carries a worm 22ª which in turn drives a worm gear 22ᵇ, the worm gear being mounted upon a shaft which carries the pulley 22ᶜ. A belt 22ᵈ passes from the pulley 22ᶜ to another pulley 22ᵉ mounted on a shaft 22ᶠ at the rear right-hand corner of the machine. The pulley 22ᵉ carries on its outer face a crank pin 22ᵍ, to which the lower end of the rod 16 is connected. It is evident that when the motor is in operation, it will result in imparting a reciprocating movement to the rod 16 and to the saw blade.

For the purpose of pressing the table 5 and the work carried thereby against the saw blade during the down stroke of the saw and for relieving pressure against the saw blade during the up-stroke of the saw blade, I provide the mechanism to be now described. Referring to Fig. 2, a cord 23 is secured to the rear end of the work table, the cord passing over a guide wheel 23$^a$ and having fastened at its lower end a weight 23$^c$. This places a constant tension on the work table and work for pressing the same against the saw blade, but any other suitable means might be employed for this purpose. The mechanism for relieving the saw from tension during the up-stroke is more particularly shown in Figs. 8 to 11. Secured to the underside of the table 5 and between the guide rails 4 is a longitudinally extending bar 24, secured at its front and rear ends to the front and rear end portions of the work table. Slidably mounted on the bar 24 is a clamping and releasing device, which is also movable above a fixed base plate 26 between stops 26$^a$ and 26$^b$ secured to the plate 26 located below the table 5 and bar 24. The slidable member comprises an element 27 having a longitudinal slot 27$^a$ in its upper portion adapted to receive the bar 24 carried by the table 5. Bridging the two sides of the upper portion of the element 27 is a cover plate 27$^b$ secured to the element 27 and located above the bar 24. The two sides of the element 27 have two diverging legs 27$^c$, which are respectively adapted to engage the stops 26$^a$ and 26$^b$ at the limits of the travel of the element 27 in its reciprocating movement. The element 27 carries at one side, as shown in Figs. 10 and 11, a plate 27$^d$, secured to the main portion of the element 27 by the screws 27$^e$.

In the space between one side of the element 27 and the plate 27$^d$ is located a dog 28 pivotally mounted on a pin 29, which pin is supported in one side of the element 27 and in the side plate 27$^d$. The dog 28 has a central cut-away portion for receiving the bar 24 of the work table as shown in Figs. 9 and 11, the top surface 28$^a$ of the cut-away portion of the dog being flattened and rounded at its end so that when the downwardly extending arm of the dog is turned in one direction, it will securely clamp the element 27 to the bar 24 of the table and cause the table to be moved thereby. When the dog is turned in the opposite direction, it releases the element 27 from the bar 24 of the table and permits the table and work to be drawn against the saw blade by the weight 23$^c$ and cord 23. An adjustable screw 30 is carried in the rear leg of the element 27 and limits the movement of the dog 28 in one direction and in this limiting position of the dog, it does not engage the bar 24. The plate 26 has a cut-away portion 26$^c$ under the element 27 so as to permit free movement of this element without engaging the plate 26 except when it engages the stops 26$^a$ and 26$^b$. Each of the two legs 27$^c$ has a pair of outwardly extending portions 27$^f$, which respectively slidably engage the stops 26$^a$ and 26$^b$ for guiding the element 27 in its reciprocating movement. A plate 26$^d$ is fastened by a screw to the top of each of the stops 26$^a$ and 26$^b$ and extends over the extensions 27$^f$, as shown in Figs. 9 and 10 for also guiding the element 27 in its reciprocating movement. At the rear end of the rear extensions 27$^f$ is secured a plate 27$^g$, to which plate a spring 31 is secured at one end. The other end of the spring 31 is secured at the rear to a pin 31' mounted on the plate 26, or the rear end of the spring 31 may be secured to any other suitable fixed point on the frame of the machine.

It is evident that when the arm of the dog 28 is moved forwardly, it will grip the underside of the bar 24 of the work table and thereby clamp the element thereto; and when the arm of the dog 28 is drawn forwardly, it will carry the element 27 and the work table forwardly, the element 27 being guided in its movement by the extensions 27$^f$ until the forward leg of the element 27 engages the stop 26$^a$, or the element 27 will stop short of the stop 26$^a$ if the length of the stroke imparted thereto is less than the distance to this stop. Upon the dog being released and being drawn against the set screw 30, the element 27 is released from the bar 24 and the spring 31 will then draw the element 27 backwardly against the stop 26$^b$, where it will remain until the dog 28 is again drawn forwardly. The mechanism for operating the dog is controlled in such a way that on the up-stroke of the saw blade, the dog is moved forwardly resulting in the work table and the work carried thereby being moved forwardly to relieve the saw blade from pressure of the work during the up-stroke. At the beginning of the down-stroke of the saw, the dog releases the element 27 from the work table permitting the clamping element to assume its rear position and permitting the work table and the work to be drawn against the saw during the down stroke by the pull of the weight 23$^c$ and cord 23.

For reciprocating the dog 28 to secure the above described operation, a spring 32 is secured at one end to the lower end of the arm of the dog and at the other end to a pin 32' fixed to the underside of the plate 26; and from the lower end of the dog, a rod or cord 33 extends forwardly and causes the clamping action to take place at the proper time. On the underside of the plate 26 is pivotally mounted a lever 34 to one end of which the cord 35 is attached. To the other end of the lever on the opposite side of the pivot is connected another cord 35, which extends rearwardly as shown in Fig. 2, and passes over a guide wheel 35' and then extends downwardly, its lower end being connected to one end of a lever 36 pivotally mounted on a support 36' on the base of the machine. The other end of the lever extends rearwardly, as shown in Figs. 1, 2 and 3. The rear end of the lever 36 carries a projection 36ª, which engages the periphery of a cam 37. The cam is conveniently mounted on the shaft 22ʳ, as well shown in Fig. 3. The periphery of the cam has substantially half of its circumference of larger diameter than the other half, as well shown in Fig. 2, with inclined portions on the periphery of the cam joining the parts of different diameter so that the end 36ª of the lever 36 will smoothly pass over the cam surface. The end of the lever 36 is kept in contact with the cam by spring 32 when the dog 28 is not actively engaging the bar 24 and by the force exerted by the work table in opposition to its forward movement when the dog 28 is in clamping position, or if desired, a spring may be directly applied to the lever 36 to keep the same in engagement with the cam. The cam 37 is mounted in such angular position on the shaft 22ʳ that it has a desired definite relation to the wheel 22ᵉ so that about the time the rod 16 and the saw blade starts its down stroke, the end of the lever 36 will ride down onto the surface of the cam of the smaller diameter where it remains until about the completion of the down stroke of the saw. This permits the dog 28 to release the work table during the down stroke of the saw. At about the beginning of the up stroke of the rod 16 and of the saw blade, the lever 36 then rides upon the cam surface of larger diameter, causing the cord 35, lever 34 and cord 33 to quickly pull the dog 28 forwardly, as well as the element 27 and the work table. These parts remain in their forward position during the up-stroke of the saw, at the completion of which the lever 36 rides down on the cam, thereby slackening the cord 35 and causing the parts to again assume the position shown in Fig. 9 where the work table is released, permitting the work to be drawn against the saw blade, as already described during the down-stroke of the saw. At the beginning of the up-stroke of the saw, the operation above described is repeated. It will thus be observed that at the beginning of the up-stroke of the saw, the table and work are moved slightly forwardly, where they remain during the up-stroke of the saw; during the down stroke of the saw, the table and work is released by the clamping mechanism to permit the saw to cut the work. Obviously the work and work table will gradually be progressed rearwardly as the work is cut and it is only during the up-stroke of the saw that the work and work table is moved forward a slight amount.

Although I have shown and described a reciprocating saw machine, it is evident that in place of the saw blade, a file might be substituted, using a modified form of holder, or any other cutting device might be used; and where the claims refer to a saw machine and to a saw blade, it will be understood that such terms include a machine using any desired cutting device such as a file.

Although I have particularly described one embodiment of this invention, various modifications may be made therein without departing from the scope of the invention.

I claim:—

1. A reciprocating saw machine comprising two flexible elements for reciprocating the saw, an oscillating element, two oscillating wheels for receiving said flexible elements and to which said flexible elements are respectively secured, and adjustable means respectively connecting said wheels to said oscillating element for tensioning said flexible element.

2. A reciprocating saw machine comprising two flexible elements for reciprocating the saw, a shaft, two oscillating wheels loosely mounted on said shaft for receiving said flexible elements respectively and to which wheels said flexible elements are respectively secured, an oscillating element mounted on said shaft, and adjustable means for connecting said wheels respectively to said oscillating element for tensioning said flexible element.

3. A reciprocating saw machine comprising a holder for the saw blade constructed of two parts opposed to each other and angularly adjustable in relation to each other, a guide for said holder, said guide having plane bearing surfaces at an angle to each other and the apex of the angle being in a vertical plane in the direction of travel of the saw, and said holder having similar bearing faces in engagement therewith.

4. A reciprocating saw machine comprising a holder for the saw blade, said holder comprising two parts opposed to each other and angularly adjustable in relation to each other, and means for clamping said parts together.

5. A reciprocating machine comprising a holder in two parts, said two parts being opposed to each other, a spacer between said two parts and around which said parts are angularly adjustable relatively to each other, and means for clamping said parts together.

6. A reciprocating machine comprising a holder in two parts, said two parts being opposed to each other and having cylindrical recesses in their opposed faces, a cylindrical spacer seated in said recesses between said parts and around which said two parts are adjustable angularly with reference to each other, and means for clamping the parts together.

7. A reciprocating saw machine comprising a movable table for holding the work, said table being biased in its movement toward the saw blade, means for reciprocating the saw blade, a reciprocating device provided with a clamping means for intermittently engaging the table for forcing the same away from the saw blade, and a cam device driven by said means for causing said reciprocating device by the action of said clamping means to engage the table during the up stroke of the saw.

8. A reciprocating saw machine comprising a frame, a table for holding the work slidably mounted on said frame, constant pressure means for forcing the work against the saw blade during the down stroke of the saw blade, a member slidably mounted on said frame beneath said table, a clamping dog carried by said member spring pressed out of engagement with said table and a cam means for intermittently operating said clamping dog to engage said table against the action of said spring to move said table with said sliding member away from the saw blade on the up stroke of the saw blade.

9. A reciprocating saw machine comprising a movable table for holding the work, weighted means for forcing the work against the saw blade during the down stroke of the saw blade, a slidable member beneath said table and a clamping means on said slidable member for intermittently engaging said table to move said table away from the saw blade during the up stroke of the saw blade.

10. A reciprocating saw machine comprising a movable table for holding the work, adjustable weighted means for forcing the work against the saw blade during the down stroke of the saw blade, a bar attached to the under side of said table extending longitudinally thereof, a sliding member beneath said table, a clamping dog carried by said sliding member and intermittently engaging said bar to clamp said table to said sliding member, and means for intermittently operating said clamping dog to intermittently move said sliding member and table away from the saw blade during the up stroke of the saw blade.

CHARLES A. MORAN.